UNITED STATES PATENT OFFICE

2,000,604

MANUFACTURE OF ALKOXYACETALDEHYDES AND ALKOXYACETIC ACIDS

Carl J. Malm, Gale F. Nadeau, and Norman F. Diesel, Rochester, N. Y., assignors to Eastman Kodak Company, Rochester, N. Y., a corporation of New York No Drawing. Application September 18, 1933, Serial No. 689,894

12 Claims. (Cl. 260—116)

This invention relates to the manufacture of alkoxyacetaldehydes and alkoxyacetic acids. One object of our invention is to provide a process of making these compounds from lower alkyl mono-ethers of ethylene glycol. Other objects will hereinafter appear.

While it has been known to oxidize lower aliphatic monohydroxy alcohols catalytically to aldehydes and acids, it has not hitherto been known to oxidize monoethers of ethylene glycol to alkoxyacetaldehydes and alkoxyacetic acids. We have discovered that the lower alkyl monoethers of ethylene glycol can be oxidized by means of air or oxygen in the presence of activated metal catalysts to give alkoxyacetaldehydes, which can be further oxidized in the liquid phase in the presence of certain catalysts to give alkoxyacetic acids.

Depending on the alkoxyacetaldehyde or alkoxyacetic acid desired, we may use any of the lower alkyl monoethers of ethylene glycol, namely the methyl, ethyl, propyl or butyl ether. The catalysts which we may use are activated metal catalysts, such as silver, copper, copper alloys, iron-molybdenum alloys, etc. The metals are preferably used in a form presenting a relatively large surface, such as gauze, turnings, asbestos impregnated with the metal, etc. The activation of the metal is effected by alternate oxidation and reduction. In the case of silver, it is necessary to use ozonized air to carry out the oxidation. Many well-known commercial ozonizers are available for supplying ozonized air. Copper may be oxidized by means of ordinary air. The reduction is carried out by means of hydrogen. Heating is, of course, necessary in all cases. In activating silver turnings, 300° C. was found to be a suitable temperature for the oxidation, and 200° C. for the reduction. We prefer to use an activated silver catalyst, because it gives rise to a much smoother oxidation of the ethylene glycol monoalkyl ether than does copper, for instance, and better yields are obtained. No detrimental aging or poisoning of any of the catalysts has been observed; on the contrary, they seem to become more efficient during their use.

A suitable apparatus for carrying out the reaction comprises a reaction tube, connected at the inlet end to a preheater, and at the outlet end to an air condenser leading to a receiver fitted with a reflux condenser to prevent loss of low-boiling material.

A mixture of ethylene glycol monoalkyl ether and air is passed through the apparatus, being warmed in the preheater to a temperature sufficient to volatilize and prevent condensation of the glycol ether. The addition of about 10% of water to the ethylene glycol monoalkyl ether aids in preventing decomposition of the aldehyde formed in the reaction. It is unnecessary to heat the catalyst externally, as the heat given off by the reaction is sufficient for this purpose. The temperature of the catalyst is controlled by adjusting the space velocity of the exit gases.

The yield of alkoxyacetaldehyde obtained has been found to depend upon the catalyst temperature and the ratio of oxygen to glycol ether. The optimum temperature varies with variation of this ratio. For instance, in oxidizing the monomethyl ether of ethylene glycol, using a silver catalyst, the maximum yield on one pass of the reaction mixture over the catalyst was found to be as follows:

| $\frac{1}{2}O_2$:glycol ether | Maximum yield |
|---|---|
|  | Per cent of theoretical |
| 5.6 | 37.5 |
| 3.6 | 53.0 |
| 1.3 | 63.0 |

It will be noted that the yield increased with decrease of the ratio of oxygen to glycol ether. For each ratio of oxygen to glycol ether, there was found to be an optimum temperature at which the maximum yield was obtained, and this temperature was observed to be lower, the lower the ratio of oxygen to glycol ether. Thus, in the present example, when the ratio was 5.6, the optimum temperature (at which the maximum yield of 37.5% was obtained) was found to be 500° C.; at a ratio of 3.6 the optimum temperature was 425° C.; and at a ratio of 1.3 the optimum temperature was 400° C. On either side of the optimum temperature the yield fell off rather sharply. For each glycol ether and each catalyst, the optimum ratio of oxygen to glycol ether and the optimum temperature are readily determined by experiment. Our process, it will be understood, is operative at conditions other than the optimum, but maximum yields will not be obtained.

A portion of the glycol ether passes through unchanged, and can readily be recovered from the reaction products by fractionation and returned to the supply. Some gaseous by-products are formed and lost. Some water is formed in the reaction. This, together with the water introduced with the glycol ether, remains with the alkoxyacetaldehyde. For the purpose of obtaining alkoxyacetic acids, however, it is not necessary that the aldehyde be freed of water.

The alkoxyacetaldehyde can be oxidized to the corresponding alkoxyacetic acid in several different ways. Approximately 1% of a soluble manganese salt, such as manganese acetate, may be added to the hydrous alkoxyacetaldehyde obtained by the fractionation of the products of the glycol ether oxidation. The aldehyde may then be oxidized by oxygen at a pressure of two to three atmospheres and a temperature of about 50° C. In place of the manganese salt, a soluble cerium salt or a mixture of soluble manganese and cobalt salts may be employed as the catalyst. Alternatively, the oxidation of the alkoxyacetaldehyde to the alkoxyacetic acid may be carried out by making approximately a 15% solution of the aldehyde in acetic acid, adding 1 to 2% of cobalt acetate or cobalt carbonate, and passing oxygen or air through the solution at atmospheric pressure, keeping the temperature at about 70° C. Good yields are obtained by either method. The resulting alkoxyacetic acid is separated from the solution by fractional distillation.

It will be understood, of course, that many variations may be made in our process, and that we are not to be limited by the details given except as indicated in the appended claims.

What we claim as our invention and desire to be secured by Letters Patent of the United States is:

1. Two-stage oxidation of a lower alkyl monoether of ethylene glycol to an alkoxyacetic acid, comprising the catalytic, vapor-phase oxidation of the alkyl monoether of ethylene glycol to the corresponding alkoxyacetaldehyde and the catalytic, liquid-phase oxidation of the alkoxyacetaldehyde to the corresponding alkoxyacetic acid.

2. Catalytic, vapor-phase oxidation of a lower alkyl monoether of ethylene glycol to the corresponding alkoxyacetaldehyde.

3. Catalytic, liquid-phase oxidation of a lower alkoxyacetaldehyde to the corresponding alkoxyacetic acid.

4. Catalytic, vapor-phase oxidation of a lower alkyl monoether of ethylene glycol to the corresponding alkoxyacetaldehyde, in which a metallic catalyst activated by alternate oxidation and reduction is employed.

5. Catalytic, vapor-phase oxidation of a lower alkyl monoether of ethylene glycol to the corresponding alkoxyacetaldehyde, in which silver activated by alternate oxidation and reduction is employed as the catalyst.

6. Catalytic, liquid-phase oxidation of a lower alkoxyacetaldehyde to the corresponding alkoxyacetic acid, in which a dissolved salt of a metal selected from the group consisting of manganese, cobalt and cerium is employed as the catalyst.

7. Two-stage oxidation of a lower alkyl monoether of ethylene glycol to an alkoxyacetic acid, comprising the oxidation of the alkyl monoether of ethylene glycol to the corresponding alkoxyacetaldehyde by reacting the ether, in the vapor phase, with free oxygen in the presence of an activated metal catalyst, and the catalytic, liquid-phase oxidation of the alkoxyacetaldehyde to the corresponding alkoxyacetic acid.

8. Oxidation of a lower alkyl monoether of ethylene glycol to the corresponding alkoxyacetaldehyde by reacting the alkyl monoether of ethylene glycol, in the vapor phase, with free oxygen, in the presence of an activated metal catalyst.

9. Oxidation of a lower alkoxyacetaldehyde to the corresponding alkoxyacetic acid by reacting the alkoxyacetaldehyde, in the liquid phase, with free oxygen in the presence of an oxygenation catalyst.

10. Oxidation of a lower alkyl monoether of ethylene glycol to the corresponding alkoxyacetaldehyde by reacting the alkyl monoether of ethylene glycol, in the vapor phase, with free oxygen in the presence of a metallic catalyst activated by alternate oxidation and reduction.

11. Catalytic oxidation of a lower alkyl monoether of ethylene glycol to the corresponding alkoxyacetaldehyde by reacting the alkyl monoether of ethylene glycol, in the vapor phase, with free oxygen in the presence of silver activated by alternate oxidation and reduction.

12. Catalytic oxidation of a lower alkoxyacetaldehyde to the corresponding alkoxyacetic acid by reacting the alkoxyacetaldehyde, in the liquid phase, with free oxygen in the presence of a dissolved salt of a metal selected from the group consisting of manganese, cobalt, and cerium.

CARL J. MALM.
GALE F. NADEAU.
NORMAN F. DIESEL.